United States Patent [19]

Grundy

[11] 3,793,596

[45] Feb. 19, 1974

[54] VITAL LEVEL DETECTOR AND "AND" GATE CIRCUIT ARRANGEMENT EMPLOYING A TWIN-TEE OSCILLATOR

[75] Inventor: Reed H. Grundy, Murrysville, Pa.

[73] Assignee: Westinghouse Air Brake Company, Swissvale, Pa.

[22] Filed: June 1, 1972

[21] Appl. No.: 258,879

[52] U.S. Cl. .................... 331/110, 317/146, 331/65, 331/142, 331/186, 340/248 B, 340/248 D

[51] Int. Cl. .................................... H03b 5/26

[58] Field of Search.. 331/65, 108 B, 110, 142, 173, 331/185, 186; 307/235; 317/31, 146; 340/248 B, 248 D

[56] References Cited

UNITED STATES PATENTS 2,905,835 9/1959 Wray .............................. 331/117 X 3,026,505 3/1962 Bevilacqua...................... 331/185 X

*Primary Examiner*—Herman Karl Saalbach

*Assistant Examiner*—Siegfried H. Grimm

*Attorney, Agent, or Firm*—H. A. Williamson; J. B. Sotak

[57] ABSTRACT

This disclosure relates to a fail-safe level detecting and AND gating circuit including a multistage solid state amplifier having a regenerative feedback loop. The regenerative feedback loop includes a frequency determining twin-tee network and a pair of voltage breakdown devices. The multistage amplifier produces a.c. oscillations when and only when the level of a d.c. voltage applied across each of the voltage breakdown devices exceeds its threshold value so that both of the breakdown devices become conductive and exhibit a low impedance condition.

10 Claims, 1 Drawing Figure

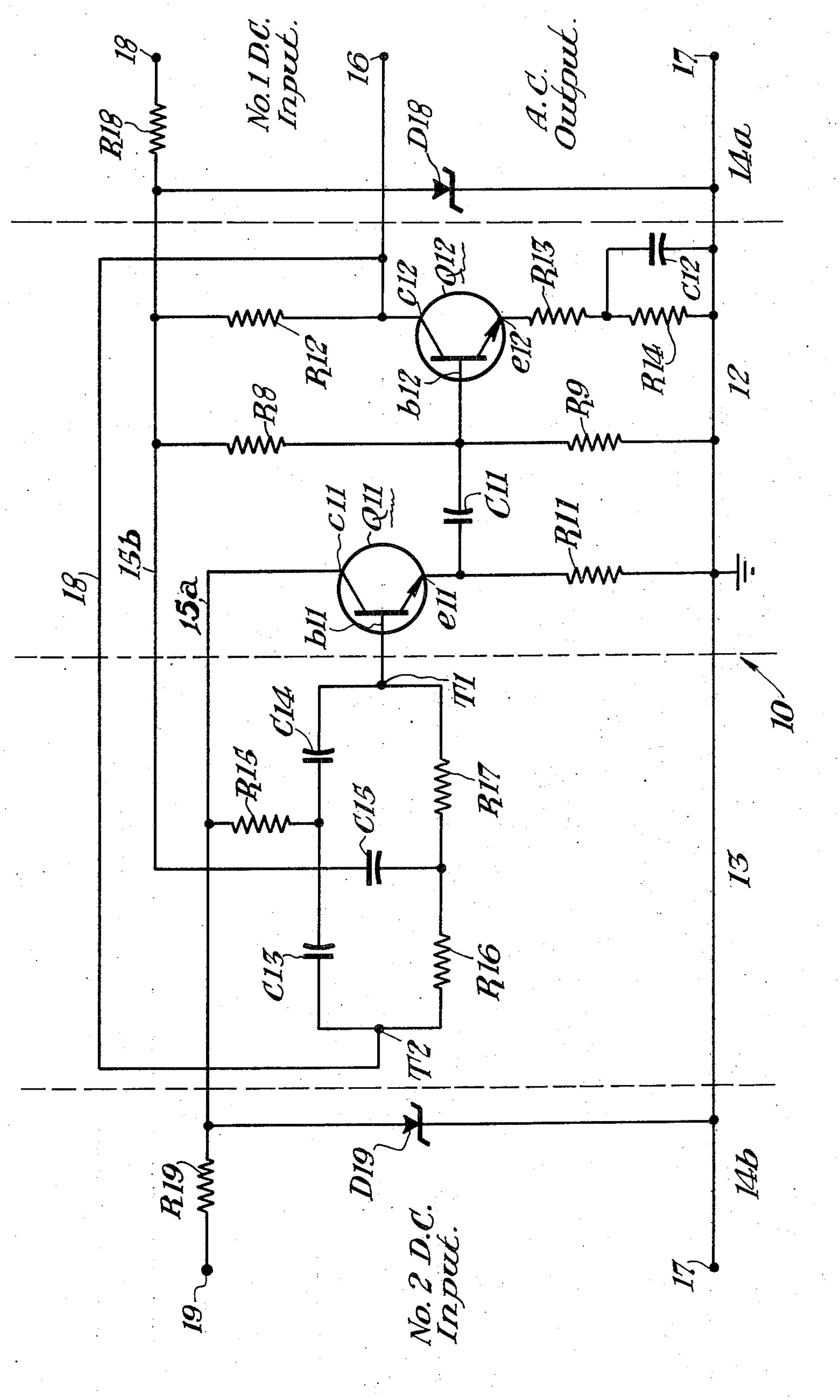
No. 1 D.C. Input.
A.C. Output.
No. 2 D.C. Input.

VITAL LEVEL DETECTOR AND "AND" GATE CIRCUIT ARRANGEMENT EMPLOYING A TWIN-TEE OSCILLATOR

This invention relates to a vital electronic detecting and gating arrangement and, more particularly, to a solid state voltage level detector and logic AND gate circuit employing a multistage transistor amplifier which includes a regenerative feedback loop having a frequency determining twin-tee filter network and a pair of shunt regulators that include voltage breakdown devices that control the impedance values in the common legs of the twin-tee filter network so that an a.c. output is produced when and only when the voltage breakdown devices conduct and assume a low dynamic impedance condition.

In various types of signal and control systems, safety is of paramount importance. For example, in a vehicle rear end protection system, it is necessary to maintain a given distance between the two successive vehicles in order to prevent collisions which could result in serious injury to individuals and costly damage to equipment. Generally, this interval is the maximum adverse braking distance that is required to bring the following vehicle to a complete stop without crashing into a forerunning vehicle. The efficiency and capacity of any transportation system is limited by the minimum safe headway between vehicles, and thus it is advantageous to design any vehicle anti-collision arrangement with this in mind. It has been found that suitable vehicle rear end protection may be effectively achieved by a unique frequency overlay arrangement. The scheme employs two different frequencies which are arranged in an overlapped relationship by alternately disposing suitable transmitters at selected distances, preferably the maximum effective braking distance along the route of travel. The principle of operation is based upon the premise that a vehicle will ordinarily receive signals of both frequencies when the route ahead is clear, namely, a preceding or forerunning vehicle is at least two braking distances in front of the oncoming vehicle. It will be appreciated that when the leading vehicle is less than two braking distances ahead of the oncoming vehicle, then the approaching vehicle will at some point only receive a single frequency since one of the signals will be removed by the leading vehicle. The receiving apparatus which is carried by the vehicles has been designed to automatically apply the service brakes any time that less than two frequency signals are being received on-board the oncoming vehicle. The car-carried receiver includes suitable pickup, filtering, amplifying, rectifying, detecting, and gating circuits which effectively energize a vital relay only when both frequencies are received on-board. While each portion or circuit of the receiver is critical, the detecting and gating circuit vitally detects the level of two inputs and logically functions to cause energization or deenergization of a vital relay which controls the service brakes on the vehicle. As mentioned above, it will be appreciated that the detecting and gating circuit must operate in a fail-safe manner so that any conceivable or foreseeable failure will not result in the energization of the vital relay unless both inputs are being received and until the level of each of the two inputs exceeds a predetermined value. Such fail-safe operation is necessary and essential in order to extend the highest degree of safety to individuals as well as to the apparatus.

Accordingly, it is an object of my invention to provide a new and improved vital circuit arrangement.

A further object of my invention is to provide a unique voltage level detector and coincident circuit which operates in a fail-safe manner.

Yet another object of my invention is to provide an improved vital level detector and AND gate for sensing the amplitude of a pair of d.c. inputs and for producing an a.c. output when the amplitude of each of the d.c. inputs exceeds a predetermined level.

Still another object of my invention is to provide a fail-safe level detecting and AND gating circuit arrangement for measuring the amplitude of a pair of d.c. inputs and for providing an a.c. output when and only when the amplitude of each of the pair of d.c. inputs exceeds a preselected value.

In addition, another object of my invention is to provide a vital amplitude level detecting and gating circuit employing a pair of voltage breakdown devices for controlling the phase shifting characteristics of a twin-tee network and, in turn, the amount of regenerative feedback supplied from the output to the input of a multistage solid state amplifier circuit.

Yet a further object of my invention is to provide a transistorized amplitude level detecting and gating circuit which operates in a fail-safe manner to provide an output voltage when and only when two inputs coincide and each input exceeds a predetermined value.

A still further object of my invention is to provide a multistage solid state amplifier having a feedback loop which includes a twin-tee network and a pair of Zener diodes that allow an a.c. output to be produced when a pair of d.c. inputs cause the Zener diodes to break down and assume a low dynamic impedance condition.

Still another object of my invention is to provide a fail-safe circuit arrangement which is simple in construction, economical in use, and efficient and reliable in operation.

Briefly, the vital solid state level detecting and AND gating circuit employs a multistage feedback transistor amplifier, a phase-shift R-C twin-tee network, and a pair of shunt type voltage regulators. The multistage feedback transistor amplifier includes a common-collector input stage and a common-emitter output stage. One leg formed by a first resistor and a first capacitor of the R-C twin-tee network is connected to the collector electrode of the common-emitter output stage. A second leg formed by a second resistor and a second capacitor of the R-C twin-tee network is connected to the base electrode of the common-collector input stage. A third leg of the R-C twin-tee network is formed by a third resistor and a third capacitor. Each of the shunt voltage regulators includes a current limiting resistor and a Zener diode connected across individual d.c. inputs. One of the pair of Zener diodes is connected in series with the third capacitor of the R-C twin-tee network while the other of the pair of Zener diodes is connected in series with the third resistor of the R-C twin-tee network. Since a Zener diode exhibits a high impedance when it is nonconducting, there is an insufficient amount of regenerative feedback at any frequency to sustain oscillations when the d.c. input potentials do not exceed the threshold value of the Zener diode. However, when the value of the d.c. input potentials exceeds the threshold values of the Zener diodes, they break down and become conductive. The conduction of the Zener diodes is accompanied by a sudden reduction in the impedance value in the common capacitive and resistive arms of the twin-tee network. The reduced impedance causes a dramatic increase in the amount of regeneration at a predetermined center frequency. Thus, the multistage amplifier produces an output so that a.c. signals will be available on the output terminals when and only when both of the d.c. input potentials exceed the predetermined threshold value.

The foregoing objects and other attendant features and advantages will be more readily appreciated as the subject invention becomes better understood by reference to the following detailed description when considered in conjunction with the accompanying drawing wherein:

The single FIGURE is a schematic circuit diagram of a vital solid state level detecting and "AND" gating circuit in accordance with the teachings of the present invention.

As shown, the vital or fail-safe electronic detecting and gating circuit, generally characterized by numeral 10, includes a two-stage phase inverting amplifier 12, an R-C twin-tee network 13, and a pair of shunt voltage regulators 14*a* and 14*b*.

The amplifier 12 includes a first input stage having a NPN transistor Q11 and a second output stage having a NPN transistor Q12. The input amplifier stage including transistor Q11 is connected in a common-collector or emitter-follower configuration in order to achieve impedance matching, namely, providing a relatively high input impedance while exhibiting a suitable low output impedance. The output amplifier stage including transistor Q12 is connected in a common-emitter configuration so that phase inversion occurs, namely, the input signal voltage is reversed 180° in passing through the transistor of the output amplifier. The transistor Q11 includes an emitter electrode *e*11, a collector electrode *c*11, and a base electrode *b*11. The emitter electrode *e*11, of transistor Q11 is connected to a reference potential, such as, ground, via resistor R11. The collector electrode *c*11 of transistor Q11 is directly connected to a first d.c. supply conductor or lead 15*a*. The base electrode *b*11 which forms the input of the amplifier is connected to an output terminal T1 of the twin-tee network 13, as will be described in greater detail hereinafter. The output from transistor Q11 is derived from emitter electrode *e*11 and is coupled to the base electrode *b*12 of output amplifying transistor Q12 via a d.c. blocking capacitor C11. A voltage divider including resistors R8 and R9 is connected between a second d.c. lead 15*b* and ground. The base electrode *b*12 of transistor Q12 is connected to the junction of biasing resistors R8 and R9. The collector electrode *c*12 of transistor Q12 is connected to d.c. potential lead 15*b* via resistor R12. The emitter electrode *e*12 of transistor Q12 is coupled to the reference terminal or ground through series connected resistors R13 and R14. A bypass capacitor C12 is connected in parallel with resistor R14 to prevent a.c. degeneration. However, the inclusion of resistor R14 increases the d.c. stability of the amplifier circuit. In a somewhat similar manner, resistor R13 stabilizes the operation of the amplifier and also controls the a.c. gain of the amplifier circuit. An output voltage in the form of a.c. signals is derived from across terminals 16 and 17. As shown, the terminal 16 is directly connected to the collector electrode *c*12 of transistor Q12 and the terminal 17 is, as shown, connected to ground.

The collector electrode *c*12 is also connected to input terminal T2 of the parallel or twin-tee network 13 via conductor or lead 18. The presently described twin-tee network 13 operates as a band-pass center frequency filter when the circuit parameters exhibit the originally designed resonant frequency characteristics. However, a change of impedance in any given element or one or more arms of the twin-tee network 13 will upset its resonant qualities and cause the network 13 to become a center frequency rejection filter. The network 13 includes a first tee having a pair of series-connected impedances or capacitors C13 and C14 connected between input terminal T2 and output terminal T1. The first tee also includes a shunt impedance or resistor R15 which has one end connected to the junction of capacitors C13 and C14. The network 13 includes a second tee having a pair of series-connected impedances or resistors R16 and R17. The second tee also includes a shunt impedance or capacitor C15 which has one end connected to the junction of resistors R16 and R17. In other words, the capacitor C13 and resistor R16 are connected in common to junction point or terminal T2 and form the input arm of the network, while capacitor C14 and resistor R17 are connected in common to junction point or terminal T1 and form the output arm of the network. The two remaining elements, namely, capacitor C15 and resistor R15 form the common arm of the twin-tee network. As previously mentioned, the input junction point T2 is directly connected to the collector electrode *c*12 so that a portion of the output signals is fed back under certain conditions. In the instant case, the twin-tee network is preferably symmetrical in that the capacitance values of capacitors C13 and C14 are equal and in that the resistance values of resistors R16 and R17 are equal. Further, the parallel-tee network is designed to be an unbalanced type of circuit in that the resistance value of R15 is not a factor of R16 or R17 and in that the capacitance value of capacitors C13 and C14 is not a factor of capacitor C15. It has been found that a twin-tee network having these characteristics, under certain conditions, will pass a given frequency signal and will phase shift the selected signal 180°. Thus, the unique phase inversion of the imperfectly nulled twin-tee network permits its usage in a positive type of feedback amplifier circuit to produce a.c. oscillations across output terminals 16 and 17, as will be described.

It will be appreciated that oscillations cannot occur unless sufficient d.c. bias voltage is available for powering the two transistor amplifying stages. As previously mentioned, the vital level detecting and AND gating circuit 10 operates in a fail-safe manner to measure the amplitude of two d.c. input voltages and performs a coincident logic function when both d.c. input voltages are validly present. As will be described hereinafter, when the subject vehicle is moving along its route of travel and no other vehicle is within two braking distance lengths in front of the subject vehicle, two different frequency signals are received on-board. That is, signals of both frequencies, such as *f*1 and *f*2, are picked up by the car-carried receiver. Each a.c. signal is amplified and rectified in a fail-safe manner and, in turn, is separately applied to the shunt regulators 14*a* and 14*b*, respectively. The first shunt regulator 14*a* comprises a series-connected current limiting resistor R18 and a breakdown device or Zener diode D18, while the second shunt regulator 14*b* comprises a series-connected current limiting resistor R19 and a breakdown device or Zener diode D19. The current limiting resistor R18 has one of its ends connected to a first input terminal 18 and has the other end connected to the anode of the Zener diode D18 while the current limiting resistor R19 has one of its ends connected to a second input terminal 19 and has the other end connected to the anode of the Zener diode D19. Each of the cathodes of Zener diodes D18 and D19 is connected to the common terminal 17, namely, ground. It can be appreciated that the operation is the same if leads 15*a* and 15*b* are connected together. The common lead is broken between resistors R11 and R9, and the inputs to the separated common leads are brought in through resistors R19 and R18 which are reconnected to the other sides of diodes D19 and D18, respectively. As previously mentioned, the common arm of the twin-tee network 13 is made up of resistor R15 and capacitor C15. It will be noted that resistor R15 is connected to ground through Zener diode D19 of regulator 14*b* while it can be seen that capacitor C15 is connected to ground through Zener diode D18 of regulator 14*a*. It will be appreciated that a nonconducting Zener diode exhibits a very high impedance while a conducting Zener diode offers little resistance to the flow of current. Thus, when the Zener diode D18 is conducting, the capacitor C15 is effectively connected to the common point, namely, ground, as is resistor R15 when Zener diode D19 is conducting. As will be described presently, by suitably controlling the impedance value in the common arms of the twin-tee, in this case the arms having capacitor C15 and resistor R15, the amount of regenerative feedback and, in turn, the amount of given losses therein may be employed to control the conductive condition of the circuit. That is, a high value of impedance appearing in either the capacitive portion of the common capacitive arm or the resistive portion of the common resistive arm will materially decrease the amount of positive feedback due to increased losses to that a.c. oscillation will not appear across output terminals 16 and 17. Thus, both of the d.c. inputs must be present in order that an a.c. output be produced on output terminals 16 and 17. As mentioned above, this may be logically defined as a coincidence or AND function in that an output is only available when every input namely, both number 1 d.c. input and number 2 d.c. input are present on terminals 18-17 and 19-17, respectively. In the presently described vehicle rear-end protection system the a.c. output is employed to energize a vital relay which controls the service brakes on the vehicle. When the vital relay is energized, the brakes of the vehicle remain released; however, when the vital relay is deenergized or released, the service brakes are applied to bring the vehicle to a safe stop.

Accordingly, when the amplitude or level of the d.c. input voltage appearing across either terminals 18-17 or 19-17 falls below the threshold or breakdown voltage value of the Zener diodes, the circuit parameters of the feedback loop are changed. As previously mentioned, if an insufficient magnitude of d.c. voltage is applied across a Zener diode, the diode will not conduct and will exhibit a high dynamic impedance. For the sake of discussion, it will be assumed that frequency signal *f*1, which provides the number 1 d.c. input across terminals 18 and 17, is no longer being picked up by the subject vehicle receiver due to a shunting effect of the leading vehicle. The diode D18 which interconnects the capacitor C15 of the common arm to ground reverts to a nonconducting condition and increases the impedance of the common capacitive characteristics to a relatively high value. Accordingly, the circuit parameters, and particularly the shunt capacitive characteristics of the common arm, are no longer tuned to the natural frequency of oscillations and, therefore, there is insufficient regenerative feedback at the center frequency. Thus under this condition, no a.c. oscillations are available on the output terminals 16 and 17. Hence, the vital relay becomes deenergized, thereby indicating that the subject vehicle is approaching a slower moving vehicle or a stopped vehicle in the path ahead. The deenergization of the vital relay may, in turn, cause the energization of a suitable speed control apparatus, such as, initiating an automatic service braking action to slow down the vehicle and to eventually stop it entirely. Let us now assume tht the forward vehicle has moved beyond two braking distance lengths so that the subject following vehicle will again pick up the *f*1 frequency signal. Thus, the number 1 d.c. input will reappear across terminals 18 and 17 and will cause Zener diode D18 to conduct again. As previously mentioned, the conduction of the Zener diode D18 is accompanied by a dramatic reduction in its impedance. That is, under this condition the number 1 d.c. input voltage is of a sufficient magnitude to cause Zener diode D18 to break down, thereby causing the diode to conduct and exhibit a low dynamic impedance. With the Zener diode D18 conducting, a low impedance path is established for the capacitor common arm of the resonant twin-tee filter circuit so that sufficient feedback voltage and a 180 degree phase shift occur for the transistor amplifier. Accordingly, with sufficient regenerative feedback, the transistor amplifier goes into oscillation and produces a.c. output signals on the output terminals 16 and 17.

Further, since the voltage across the Zener diodes D18 and D19 remains substantially constant, there may be a wide range of voltage and current changes at the input terminals 18 and 19. Thus, the various biasing voltages supplied by the voltage regulator ensure stable operation of the transistor amplifier. In addition, it has been found that oscillations occur almost exactly at the Zener level so that a sharp and highly accurate level detector is realized. As is well known, the a.c. output power which is available at the collector electrode *c*12 is a function of the amplifier gain minus the feedback power. It will be appreciated that the a.c. voltage on output terminals 16 and 17 may be suitably amplified and rectified and, in turn, may be employed to energize the vital relay, thereby ensuring that the path ahead is clear and that the subject vehicle may proceed at the preselected command request without fear of a rear-end collision.

As previously mentioned, the presently disclosed level detecting and gating circuit operates in a fail-safe manner in that no conceivable critical component or circuit failure is capable of producing an a.c. output on the output terminals 16 and 17 except when both of the Zener diodes D18 and D19 conduct and assume a low impedance condition. It will be noted, if either of the Zener diodes becomes short-circuited, the necessary biasing and supply voltages are not avilable for either the first stage or the second stage transistor or both and, therefore, the amplifier is incapable of going into oscillation. If either of the Zener diodes becomes open-circuited, it is quite apparent that a required low impedance path between the shunt capacitor or resistor portion of the twin-tee and ground is not present so that oscillations cannot occur and no a.c. output signals will be available at the output terminals 16 and 17. If either of the Zener diodes becomes leaky or conducts at some voltage lower than the normal breakdown voltage, the dynamic impedance exhibited by the diode is still generally sufficient to cause an appreciable amount of degeneration and lacks the necessary phase shift so that oscillations will not occur. An open-circuit failure of either of the current limiting resistors of the regulators is obviously a safe condition. Normally, fail-safeness is based on the premise that critical resistors or resistor elements cannot become short-circuited due to the particular types of resistors, namely, carbon composition of a specific manufacture, employed in circuits which must operate in a fail-safe manner. It will be noted that the various other components and elements constituting the amplifier circuit will either fail in a safe manner or destroy the circuit integrity to the point where oscillations will not occur. Accordingly, it will be observed that the presently described level detector and gate circuit operates in a fail-safe manner so that an a.c. output is available only at the terminals 16 and 17 when and only when a predetermined value of d.c. inputs is applied to the input terminals 18-17 and 19-17, respectively.

It will be appreciated that while this invention finds particular utility in a vehicle separation control system, it is readily evident that the invention is not merely limited thereto but may be employed in various other systems and apparatus which require the security and safety inherent in the invention, but regardless of the manner in which the invention is used, it is understood that various alterations may be made by a person skilled in the art without departing from the spirit and scope of this invention. It will also be apparent that other modifications and changes can be made in the presently described invention, and therefore it is understood that all changes, equivalents, and alterations within the spirit and scope of this invention are herein meant to be included as set forth in the appended claims.

Having thus described my invention, what I claim is:

1. A vital circuit for producing a.c. output oscillations only upon the concurrent appearance of a first and a second d.c. input comprising, a multistage amplifier having a regenerative feedback loop, said regenerative feedback loop including a frequency selective network for determining a given frequency of oscillation, and a pair of voltage responsive devices cooperatively associated with said frequency selective network for controlling the amount of regenerative feedback occurring at the given frequency so that a.c. output oscillations are produced by the multistage amplifier when said pair of voltage responsive devices are rendered conductive by said first and said second d.c. inputs exceeding a predetermined value.

2. A vital circuit as defined in claim 1, wherein said frequency selective network comprises a twin-tee filter having a high pass portion and a low pass portion.

3. A vital circuit as defined in claim 1, wherein said frequency selective network includes a filter circuit having input, output and common impedance legs.

4. A vital circuit as defined in claim 1, wherein each of said pairs of said voltage responsive devices comprises a Zener diode.

5. A vital circuit as defined in claim 3, wherein said pair of voltage responsive devices control the impedance value of the common leg of said filter circuit.

6. A vital circuit as defined in claim 2, wherein said twin-tee circuit includes a plurality of resistors and capacitors.

7. A vital circuit as defined in claim 1, wherein said multistage amplifier includes a two-stage transistor circuit.

8. A vital circuit as defined in claim 7, wherein said feedback loop is taken from the output of the second of said two-stage transistor circuit and applied to the input of the first of said two-stage transistor circuit.

9. A vital circuit as defined in claim 7, wherein the two-stage transistor circuit includes a first stage which is connected in a common collector configuration and a second stage which is connected in a common-emitter configuration.

10. A vital circuit as defined in claim 1, wherein said frequency selective circuit comprises a twin-tee network having an input, an output and a common leg, each of said legs including a resistor and a capacitor, said resistor of said common leg is connected in series with one of said pair of said voltage responsive devices and said capacitor of said common leg is connected in series with the other of said pair of said voltage responsive devices.

* * * * *